United States Patent
Saho et al.

(10) Patent No.: US 6,478,955 B1
(45) Date of Patent: Nov. 12, 2002

(54) MEMBRANE MAGNETIC SEPARATING APPARATUS

(75) Inventors: Norihide Saho, Tsuchiura (JP); Hisashi Isogami, Ushiku (JP); Minoru Morita, Abiko (JP); Tadashi Sano, Ryugasaki (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 09/703,925

(22) Filed: Nov. 2, 2000

(30) Foreign Application Priority Data

Nov. 2, 1999 (JP) .......................... 11-311950
Mar. 31, 2000 (JP) ...................... 2000-101193

(51) Int. Cl.[7] .......................... B01D 35/06; B01D 24/00
(52) U.S. Cl. .................. 210/223; 210/222; 210/182; 210/295; 210/297; 210/402; 210/407; 209/213; 209/223.1
(58) Field of Search ................ 210/222, 223, 210/182, 295, 297, 402, 407; 209/213, 223.1

(56) References Cited

U.S. PATENT DOCUMENTS 4,039,447 A 8/1977 Miura et al.
5,944,986 A 8/1999 Saho et al.

FOREIGN PATENT DOCUMENTS

EP 0931593 7/1999

OTHER PUBLICATIONS

Chem. Tech. Magazine MOL vol. 22, No. 12, pp. 47–51, 1984, Japan.
Service Water & Waste Water vol. 23, No. 9, pp. 43–52, 1981, Japan.

Primary Examiner—David A. Reifsnyder
(74) Attorney, Agent, or Firm—Crowell & Moring LLP

(57) ABSTRACT

Water to be treated is passed through a membrane (net), magnetic floc positioned in a portion below a level of the water to be treated is deposited to a surface of the membrane, and the surface of the membrane with the magnetic floc deposited is moved to an atmospheric portion above the level of the water to be treated. In the atmospheric portion, excess water from the magnetic floc flows downward due to gravity to concentrate the magnetic floc. A permanent magnet is located near a position to which the membrane surface with the magnetic floc deposited thereon moves. There are further provided between the magnet and the membrane surface a moving body (shell) formed by a non-magnetic material, a spatula for scraping the magnetic floc from the moving body, and a sludge vessel in which a released magnetic floc is recovered.

13 Claims, 14 Drawing Sheets

MEMBRANE MAGNETIC SEPARATING APPARATUS

BACKGROUND OF THE INVENTION

The present invention relates to a membrane magnetic separating apparatus for water purification, solid-liquid separation or the like, and in particular, to a membrane magnetic separating apparatus for continuously performing capturing of a magnetic substance by a membrane and magnetically separating of the captured substance.

A purifying apparatus for the purpose of water purification or the like through solid-liquid separation and using a fine gauze or a net knitted out of polymer fibers as a water separating film to separate and remove particles is described, for example, in "Service Water & Waste Water" Vol. 23, No. 9 (1981), pp. 43–52. Such a purifying apparatus comprises a net formed of thin stainless steel wires, polyester fibers, or the like so as to have sieve openings of, for example, several tens of micron meters size so that water to be treated passes through the openings. If a substance to be treated (for example, a contaminant such as water-bloom or an organism) in the water to be treated has a projected area (or a projected diameter) larger than that of the opening in the net, it cannot pass through the net and will be captured and separated from the water, so that the water, permeating through the membrane (net), is purified. When the water to be treated is allowed to continuously permeate the same membrane surface, the substance to be treated deposits on a permeation-side surface of the membrane to increase permeation resistance to extremely reduce an amount of water permeating. Thus, the membrane surface with the deposits (a portion of the surface the membrane below a level of the water to be treated) is moved to an atmospheric portion above the level of the water to be treated, where the membrane is washed using, for example, a shower of purified water. A mixture of the washing water and the deposits is ejected from a separation system as sludge, and the washed membrane surface is returned below the level of the water to be treated.

Alternatively, if a fine contaminant smaller than the projected area (projected diameter) of the opening is to be separated, a coagulant such as aluminum sulfate, polyaluminum chloride, or polyiron sulfate is added to the water to be treated, which is then agitated. As a result, fine solid suspensions, algae, fungi, microorganisms, or the like in the water to be treated are coagulated to a size on the order of several hundred micron meters to form flocs. Forming such flocs enables even a membrane with sieve openings of several tens of micron meters size to capture and separate the fine contaminant at a high removal rate to obtain high quality purified water. A membrane washing structure in this case is the same as the one described above. The sludge is finally transported by a truck to a disposal or incineration field or composted.

In the above conventional examples, the deposits on the membrane surface have a high deposition density (only a small amount of water is contained in the gap among the deposits) and the water content is low. A large amount of washing water, however, is used to remove the deposits from the membrane to reduce the concentration of the deposits (sludge), thereby increasing the water content substantially above that during deposition on the membrane surface.

The water content thereof must be reduced before transportation or compost treatment. It must be reduced to about 85% so as to prevent water from leaking from the sludge when the sludge is transported by the truck to the disposal or incineration field. It must be reduced to about 75% so as to activate micro-organisms that decompose organisms during compost treatment when the sludge is composted. However, the water content of the sludge after washing by water is 99% and the volume thereof thus becomes 15 times (in case of transportation) or 25 times (in case of compost treatment) as large as that before the washing treatment. Since this differential in the water content must be removed, the sludge is further dehydrated using a dehydration means such as a centrifugal dehydrator or a belt press machine. The larger the water content of the sludge in an input section of the dehydration means is, the higher treatment performance the dehydration means must provide, thereby increasing apparatus costs and operation energy costs.

In addition, 5% to 10% of the purified water free from the contaminant is used to wash and remove the deposits collected on the membrane, so that an amount of purified water obtained decreases correspondingly, resulting in a reduced purification capacity.

SUMMARY OF THE INVENTION

It is an object of the present invention to provide a membrane magnetic separating apparatus that can separate a substance to be removed captured on a membrane using no or a reduced amount of washing water.

It is another object of the present invention to provide a membrane magnetic separating apparatus that can eject a dense sludge of a substance to be removed of a low water content.

To attain these objects, a first characterizing feature of the present invention is a membrane magnetic separating apparatus comprising: a filter (for example, a net-like body or a membrane-like body) for filtering water to be treated containing magnetic substance to be removed, the filter having sieve openings through which the magnetic substance in the water to be treated cannot pass; a magnetic field generator (for example, a permanent magnet) for magnetically releasing the magnetic substance deposited on the filter from a surface of the filter; a capturing and moving body (for example, a thin shell of stainless steel), provided between the filter and the magnetic field generator, for capturing the magnetic substance released from the surface of the filter while the magnetic substance is spatially moving toward the magnetic field generator, the capturing and moving body further moving the captured magnetic substance from a first space where a magnetic field intensity from the magnetic field generator is high to a second space where the magnetic field intensity is low; a scraper (for example, a spatula) for scraping the magnetic substance captured on the capturing and moving body in the second space; and a sludge vessel for recovering the scraped magnetic substance.

The magnetic substance to be removed may be magnetic floc obtained by adding a magnetic substance and a coagulant or an additive that chemically reacts to the substance to be removed to generate a magnetic substance, to a fluid containing a magnetic or non-magnetic substance to be removed. Furthermore, the substance to be removed may be magnetic floc obtained by adding a magnetic substance to a fluid containing a non-magnetic substance to be removed.

A second characterizing feature of the present invention is a membrane magnetic separating apparatus comprising: a device for generating water to be treated containing a magnetic floc which is formed from a substance to be removed by adding a magnetic substance and a coagulant to a fluid containing the substance to be removed; a filter for filtering the water to be treated, the filter having sieve openings through which the magnetic flock in the water to be treated cannot pass; a magnetic field generator for magnetically releasing the magnetic floc deposited on said filter, from a surface of the filter; a capturing and moving body, provided between said filter and said magnetic field generator, for capturing the magnetic floc magnetically released from the surface of the filter while the magnetic floc is spatially moving toward said magnetic field generator, the capturing and moving body further moving said captured magnetic floc from a first space where a magnetic field intensity from the magnetic field generator is high to a second space where the magnetic field intensity is low; a scraper for scraping the magnetic floc on said capturing and moving body in the second space; and a sludge vessel for recovering the scraped magnetic floc.

It is preferable that the capturing and moving body comprises a water absorbing material having a water absorbing function and means for dehydrating water absorbed by the water absorbing material.

A third characterizing feature of the present invention is a membrane magnetic separating apparatus comprising: a filter for filtering water to be treated containing magnetic substance to be removed, the filter having sieve openings through which the magnetic substance cannot pass; a releasing device for using a force of a fluid such as water or air to release the magnetic substance deposited on the filter, from a surface of the filter; a magnetic field generator for moving the released magnetic substance so as to be magnetically attracted; a capturing and moving body, provided between said filter and said magnetic field generator, for capturing the magnetic substance released from the surface of the filter while the magnetic substance is spatially moving toward said magnetic field generator, the capturing and moving body further moving said captured substance from a first space where a magnetic field intensity from the magnetic field generator is high to a second space where the magnetic field intensity is low; a scraper for scraping the magnetic substance on said capturing and moving body in the second space; and a sludge vessel for recovering the scraped substance.

A heating device may be provided which heats the substance moving on the capturing and moving body. The heating device can be one which selectively heats a dielectric in the substance moving on the capturing and moving body.

A sterilization device may be effectively provided for sterilizing a filtering surface of the filter or a capturing surface of the capturing and moving body.

The capturing and moving body may have an oxidation catalyst for oxidizing organisms on the capturing surface.

The other features, objects, and benefits of the present invention will be apparent from the following description taken in conjunction with the accompanying drawings.

DESCRIPTION OF PREFERRED EMBODIMENTS

Figure 1:
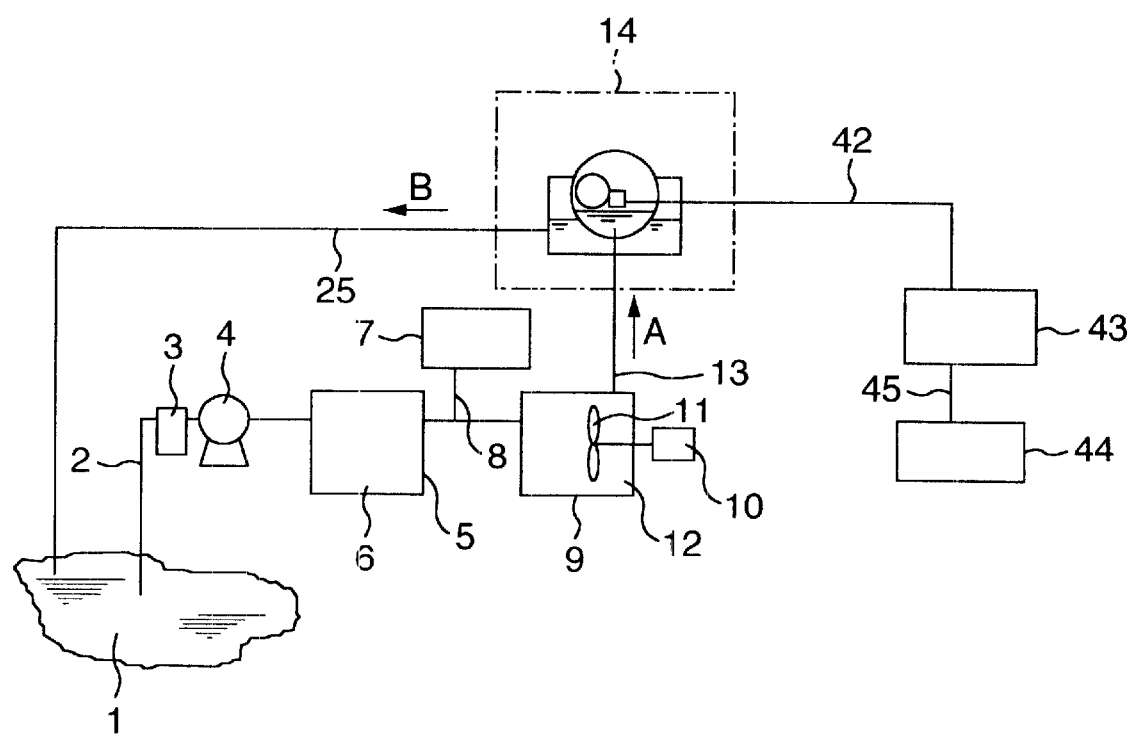
FIG. 1 is a systematic diagram of a first embodiment of a membrane magnetic separating apparatus according to the present invention and its peripheries.

Features of preferred embodiments of the present invention will be described. Magnetic floc is formed by adding magnetic powders to water to be treated, adding a coagulant such as aluminum sulfate, polyaluminum chloride, or polyiron sulfate to the water to be treated, agitating the mixture, and using a coagulant to bind together the magnetic powders and a substance to be removed in the water to be treated, that is a contaminant such as solid suspensions, algae, fungi, or microorganisms to a size on the order of several hundred micron meters. The floc cannot pass through sieve openings of several tens of micron meters size and is thus captured and separated from the water to be treated at a high removal rate and then deposited on the membrane, while water permeating through the membrane becomes high quality purified water.

A membrane surface with the magnetic floc deposited thereon which is located below level of the water to be treated is moved to an atmospheric portion above the level of the water to be treated. At this point, a certain amount of excess water in the magnetic floc flows downward along the membrane surface due to gravity, so that the water content of the deposit on the membrane surface in the atmospheric portion decreases down to, for example, about 95%. A magnetic field generating means (for example, a permanent magnet, a superconductive coil magnet, or a superconductive bulk magnet) is located near the membrane surface with the magnetic floc deposited thereon, and a belt-shaped moving body made of a non-magnetic material is located between the magnetic field generating means and the membrane surface.

The magnetic floc on the membrane, which has been moved to the atmospheric portion, is magnetically strongly attracted by the magnetic field generating means and magnetically separated from the membrane surface. The magnetic floc then travels through the atmosphere toward the magnetic field generating means at a high speed and adheres to a surface of the moving body. Due to a resulting collision force, more water is separated from the magnetic floc and flows downward along the moving body surface or falls downward because of the gravity, thereby reducing the water content of the magnetic floc. In addition, a magnetic force from the magnetic field generating means magnetically compresses the magnetic floc on the moving body surface to push excess water out from the magnetic floc. This water flows downward along the moving body surface or falls downward because of the gravity, thereby further reducing the water content of the magnetic floc down to, for example, about 90%.

The moving body moves independently away from the magnetic field generating means, and a scraping means, for example, a spatula scrapes the magnetic floc from the moving body surface in a site where the magnetic force is weak, to remove it from a separation section as sludge. This operation requires no washing water and enables the membrane surface to be magnetically recovered and returned to a site below the level of the water to be treated. On the other hand, the moving body surface, from which the magnetic substance has been removed, is then recovered and moved to the magnetic field generating means again to allow magnetic floc on the membrane surface to adhere thereto.

This structure enables deposits on the membrane surface to be released and separated without using washing water, thereby obtaining a high-concentration sludge of about 90% water content without increasing the water content of the deposits. Accordingly, the volume of the sludge is about one tenths of that obtained after washing in water according to the prior art, that is, 99%. Thus, if the water content is reduced to about 85% so as to prevent water from leaking from the sludge when the sludge is transported by a truck to the disposal or incineration field, or to about 75% so as to activate microorganisms that decompose organisms during compost treatment when the sludge is composted, a dehydration means such as a centrifugal dehydrator or a belt press machine is required but must have only one-tenths of the treatment performance and one-tenths of the amount of dehydration compared to the prior art, thereby substantially reducing dehydration means costs and operation energy costs.

In addition, no washing water is required to wash the deposits on the membrane, thereby preventing a decrease in an amount of purified water and thus a decrease in purification capacity.

Additionally, if releasing water is used to release the deposits from the membrane, it returns toward water permeating through the membrane and thus does not enter the sludge, thereby preventing an increase in the water contents of the recovered sludge.

Figure 2:
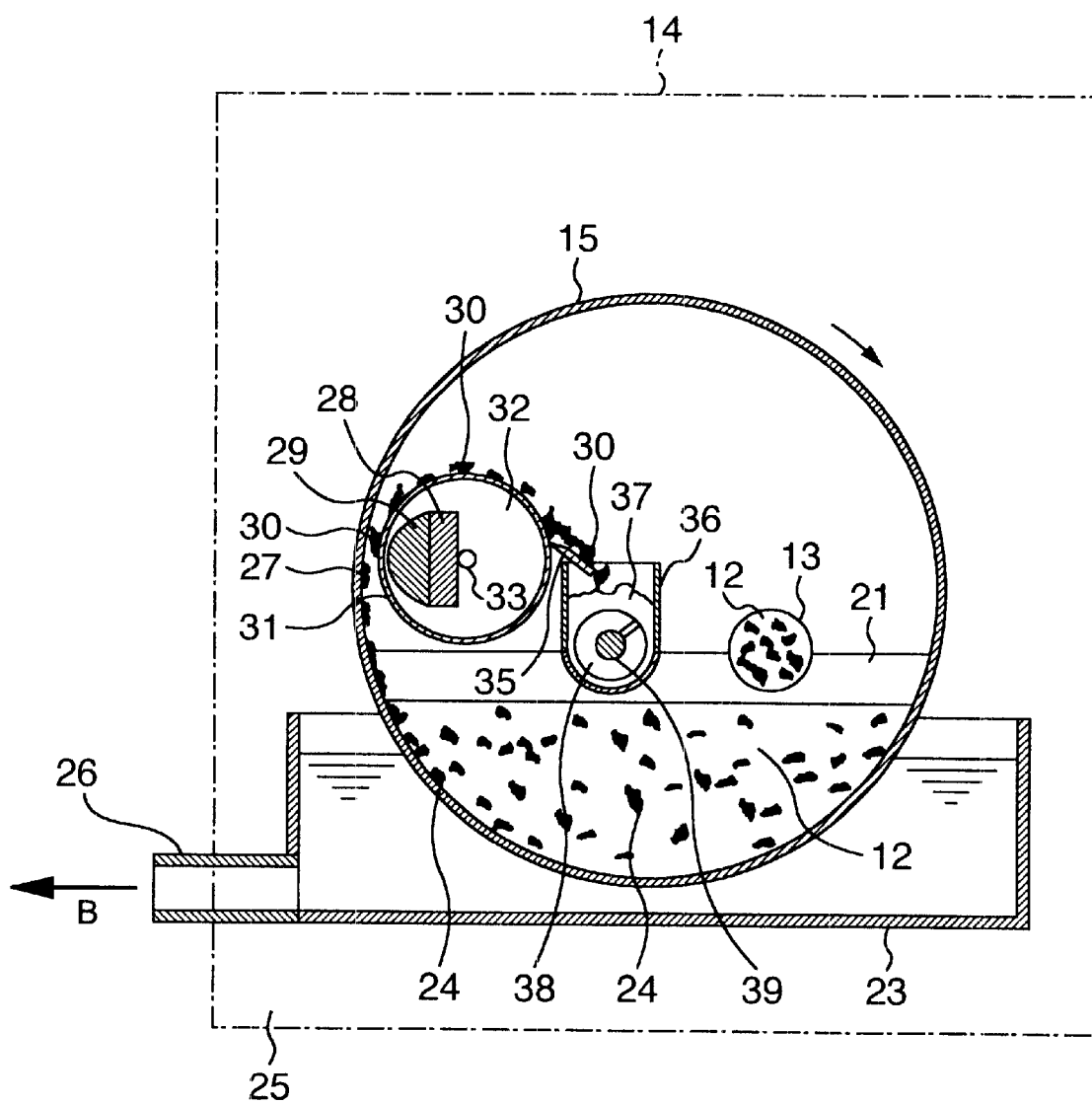
FIG. 2 is a vertical sectional view of the membrane magnetic separating apparatus shown in FIG. 1.
Figure 3:
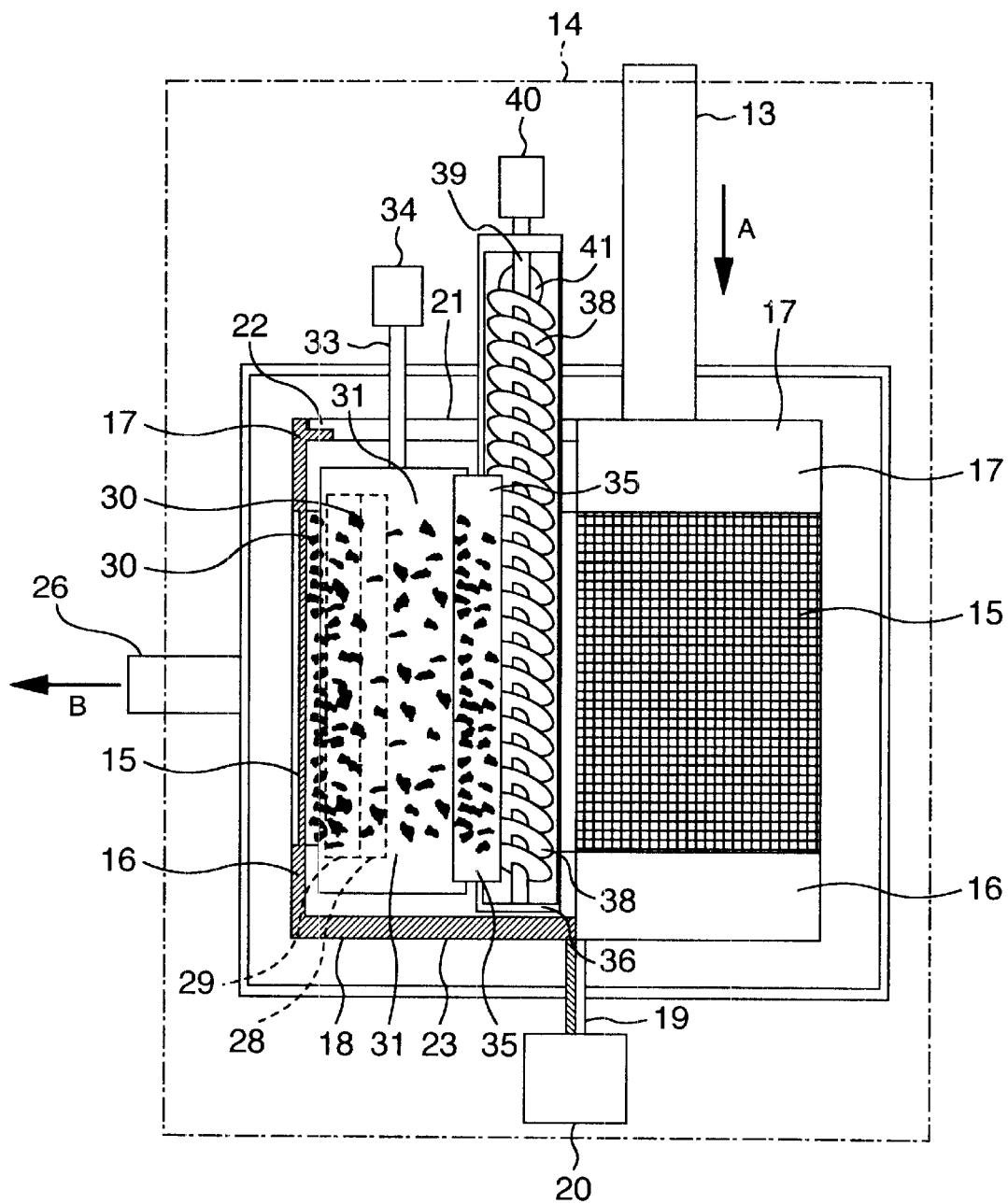
FIG. 3 is a top view of the membrane magnetic separating apparatus shown in FIG. 2, in which a left half is shown in section.

A specific embodiment will be described with reference to the drawings. FIGS. 1 to 3 show a first embodiment of the present invention. FIG. 2 is an enlarged sectional view of a membrane separating apparatus in FIG. 1. FIG. 3 is a half sectional view of the membrane separating apparatus shown in FIG. 2 as seen from above.

As shown in FIG. 1, raw water that is water to be treated flows from a water source (for example, a reservoir) 1 through a conduit 2 and a filter 3 for removing large dirt and is then drawn into a raw water storage tank 5 by means of a pump 4. A seeding agent regulating device 7 adds magnetic powders such as ion tetroxide, a pH regulator, a coagulant (a water solution of polyaluminum chloride, iron chloride, or ferric sulfate) for providing aluminum or iron ions, and a polymer reinforcing agent to raw water 6 through a conduit 8, and supplies the raw water to an agitation vessel 9. The agitation vessel 9 has agitation vanes 11 rotationally driven by a motor 10 to agitate the water to form magnetic floc of size several hundred micron meters to several millimeters to thereby generate water to be treated 12. The water to be treated flows through a conduit 13 into the membrane separating device 14 as shown by an arrow A.

The structure of the membrane magnetic separating apparatus 14 will be described with reference to FIGS. 2 and 3. Reference numeral 15 denotes a drum-shaped net (membrane) composed of fine lines of stainless steel, copper, polyester fibers, or the like and having sieve openings of size several to several tens of micron meters. Opposite ends of the net 15 are jointed to drum-shaped shells 16 and 17 without any sieve opening, with one of the ends integrally joined to a flange 18. The flange 18 has a central portion fixed to a rod 19, and the drum-shaped net 15 is rotated by a motor 20 via the rod 19, the flange 18, and the shell 16. The shell 17 slides rotationally while being kept in air-tight contact with a fixed flange 21 through a sliding surface 22. A purified water vessel 23 is located outside the net 15. The water to be treated 12 flows from the conduit 13 into the drum-shaped net 15 and passes therethrough. At this point, magnetic floc 24 in the water to be treated 12 is captured by an inner surface of the net 15. After passing through the net 15, the water free from the magnetic floc 24 becomes purified water 25, which is collected in the purified water vessel 23 and is then discharged to the water source (reservoir) 1 through a pipe 26 as shown by an arrow B. The water to be treated permeates through the net 15 based on a difference in level between the water to be treated 12 and the purified water 25. On the other hand, the magnetic floc 24 adheres to and deposits on the inner surface of the net 15 due to permeation resistance. The net 15 rotates clockwise in FIG. 2 and the deposited magnetic floc 24 is exposed to the atmospheric portion above the level. At this point, part of the water in the magnetic floc flows downward along the net 15 due to the gravity, thereby reducing the water content of the deposits on the net (membrane) surface exposed to the atmospheric portion above the level, down to about 95% and the deposits are concentrated.

When the magnetic floc 27 exposed to the atmospheric portion and concentrated approaches a magnetic field generator comprising, for example, a permanent magnet 28 having a surface magnetic field intensity of 0.5 tesla and an iron magnetic pole 29, it is separated and moved from the net 15 toward the magnetic pole 29 at a high speed due to a magnetic gradient outside the magnetic field generator. The moved magnetic floc 30 adheres to a non-magnetic moving body (or a thin shell) 31 (made, for example, of stainless steel) that rotationally moves outside the magnetic field generator. Resulting collision force causes excess water to be separated from the magnetic floc 30 adhering to the moving body 31 and the magnetic floc 30 is further concentrated. The magnetic floc 30 adhering to the moving body 31 is subjected to a magnetic compression force from the magnetic powders in the magnetic floc because of the magnetic gradient of the magnetic field generator, so that more excess water is pushed out from the magnetic floc 30, which is thus further concentrated. The separated water flows downward on a surface of the shell 31 or falls downward. Thus, the water content of the magnetic floc decreases down to about 90%.

The shell (moving body) 31 has an end integrally joined to a flange 32. A rod 33 fixed to the flange 32 is rotated in clockwise in FIG. 2 by a motor 34 to rotate the concentrated magnetic floc 30 on the shell surface in clockwise. When the magnetic floc 30 moves away from the magnetic field generator, the magnetic attraction force weakens and the floc is released from the shell surface by a fixed spatula (a scraper) 35 and is then separated and collected in a sludge vessel 36 as sludge 37. A collecting member (for example, a spiral plate member) 38 located in a lower part of the sludge vessel 36 is then rotated by a motor 40 via a rod 39 to transfer the sludge 37 in the sludge vessel 36 upward in FIG. 3 to eject it from an outlet 41.

The ejected sludge 37 passes through a pipe 42 shown in FIG. 1 and is then stored in a sludge vessel 43. In the sludge vessel 43, the water content of the sludge is further reduced using dehydration device such as a centrifugal separator, a belt press machine, or the like in such a manner that it is reduced to about 85% so as to prevent water from leaking from the sludge when the sludge is transported, or to about 75% so as to activate microorganisms that decompose organisms during compost treatment when the sludge is composted. The concentrated sludge is transported by a truck to a disposal or incineration field or transferred through a channel 45 to a compost vessel 44 provided after the sludge vessel 43 for compost treatment. After the compost treatment, the compost may be crushed to powders so that magnetic powders or generated magnetic substances can be recovered from the composite for reuse by means of another magnetic separating device.

According to this embodiment, since the deposits on the membrane (net) can be released and separated without using washing water, the water content of the deposits is prevented from increasing, thereby allowing a high-concentration sludge having a water content of about 90% to be recovered. Consequently, the volume of the sludge can be reduced to about one tenths of that obtained after washing in water according to the prior art, that is, 99%. Thus, when the sludge is transported by a truck to a disposal or incineration field or composted, a dehydration device such as a centrifugal dehydrator or a belt press machine is used to lessen the water content of the sludge but must have only one-tenths of the treatment performance and one-tenths of the amount of dehydration compared to the prior art, thereby substantially reducing dehydration device costs and operation energy costs. Furthermore, no washing water is used to wash the deposits on the net, thereby preventing a decrease in the amount of purified water and increasing the purification capacity. Moreover, since no washing water is used, the net is prevented from undergoing a repeated stress caused by the pressure of washing water, thereby precluding the fibers of the net from being broken. As a result, the lifetime of the net becomes long to reduce the frequency with which the net is replaced, thereby substantially reducing costs.

In the above embodiment, similar effects are obtained by using a water solution of a pH regulator and iron chloride or ferric sulfate to provide only iron ions without introducing magnetic powders such as iron tetroxide through the seeding agent regulator 7, to generate floc comprising iron hydroxide as a main coagulating component so that the low magnetic susceptibility of the iron hydroxide can be used to magnetically separate the floc. This method can further reduce operation costs because no magnetic powders are used.

Figure 4:
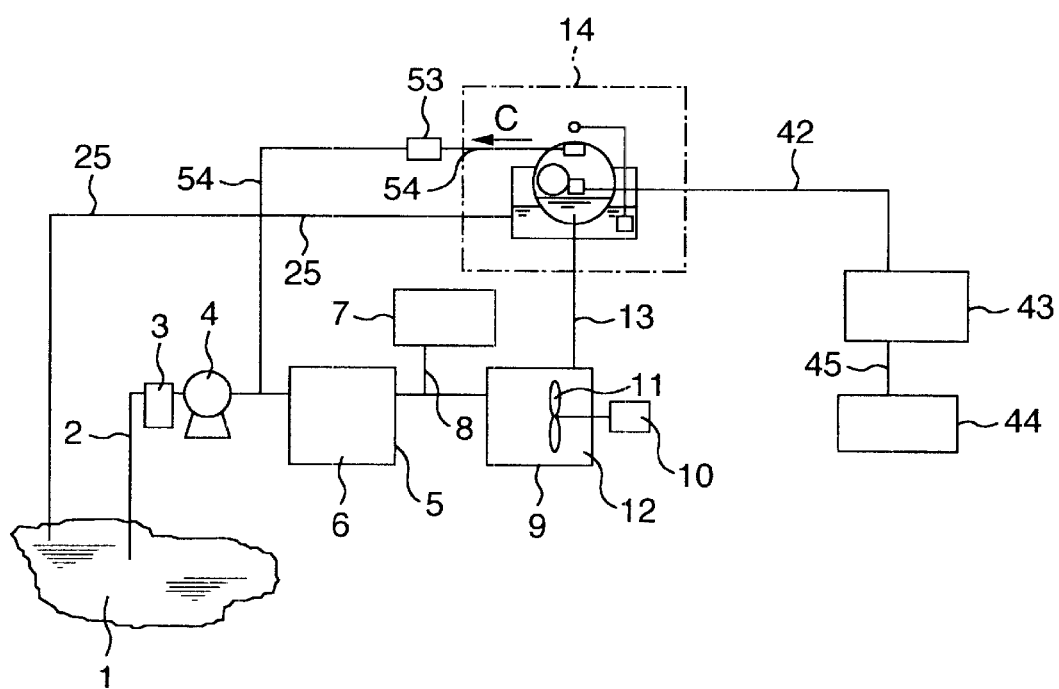
FIG. 4 is a systematic diagram of a second embodiment of the membrane magnetic separating apparatus of the present invention and its peripheries.
Figure 5:
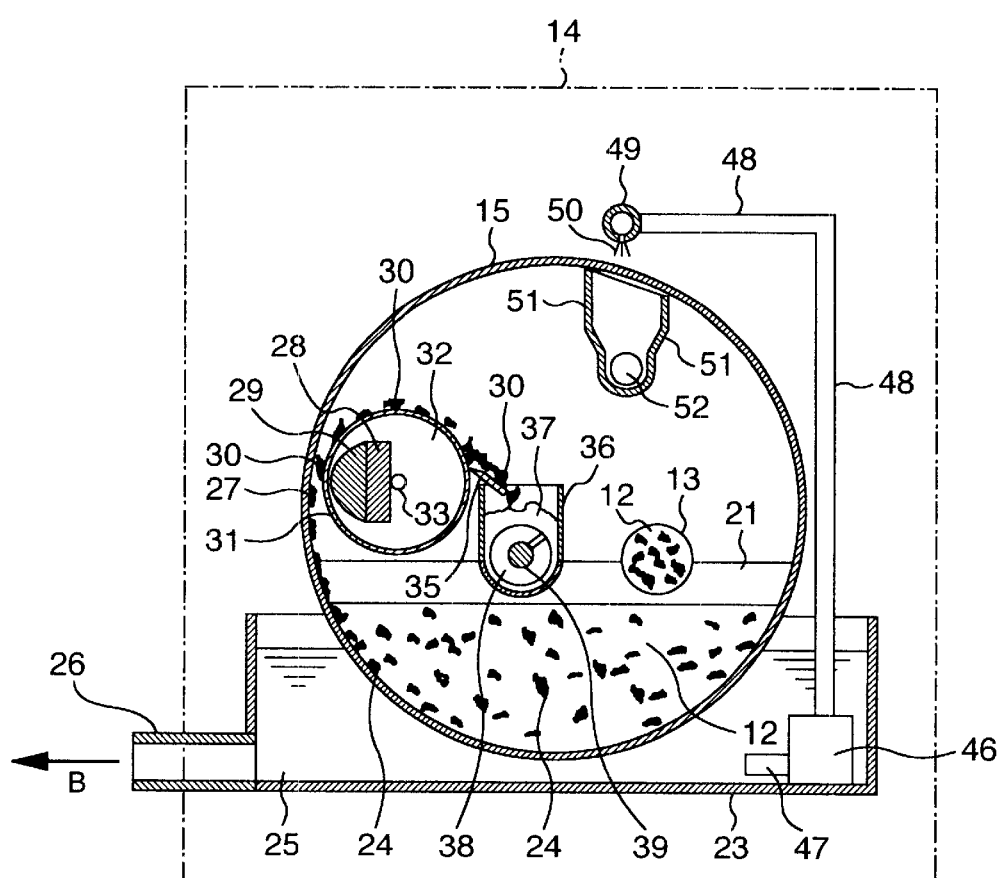
FIG. 5 is a vertical sectional view of the membrane magnetic separating apparatus shown in FIG. 4.
Figure 6:
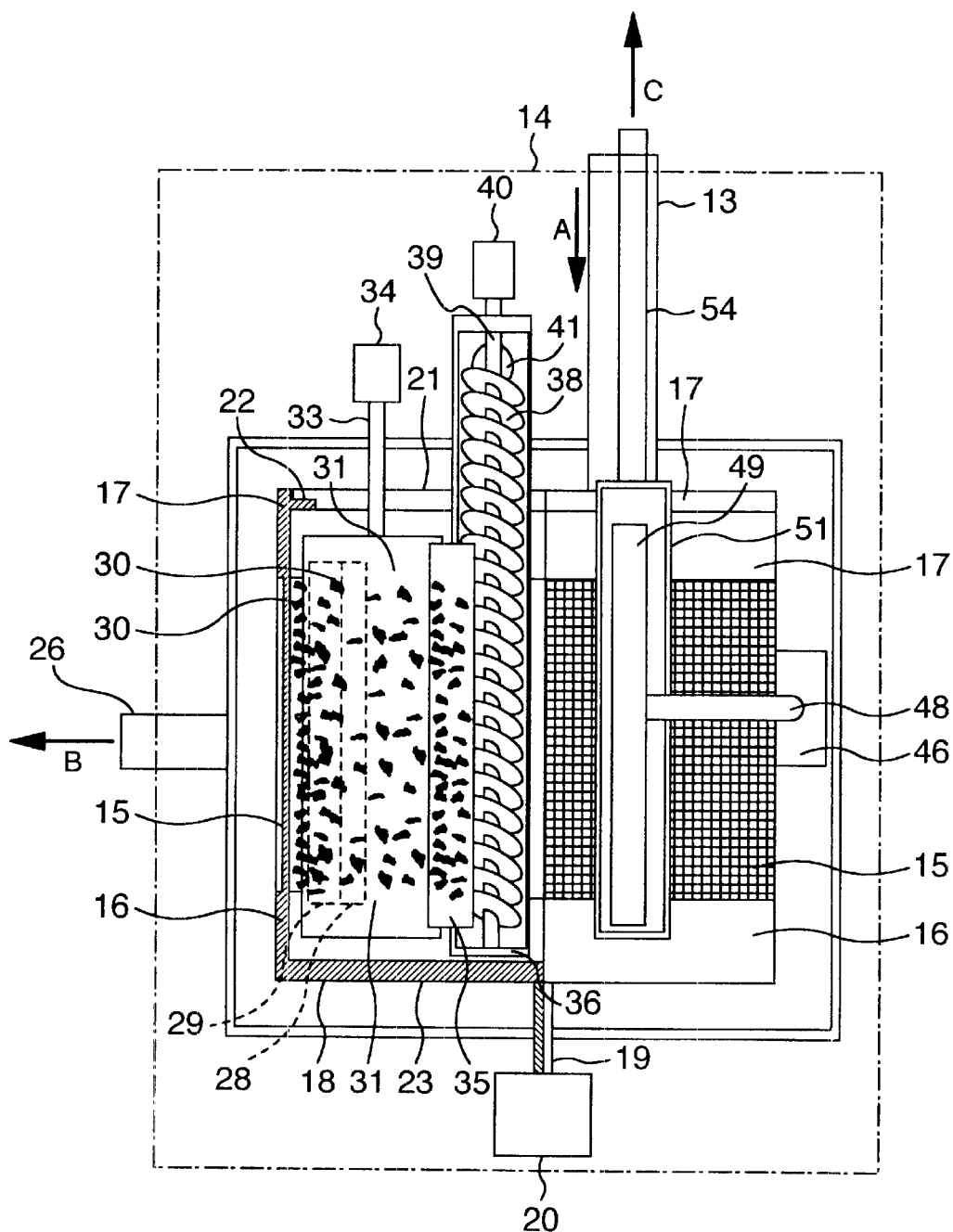
FIG. 6 is a top view of the membrane magnetic separating apparatus shown in FIG. 5, in which a left half is shown in section.

FIGS. 4 to 6 show a second embodiment of the present invention. The differences between this embodiment and the embodiment in FIGS. 1 to 3 are as follows. Among the deposits on the net (membrane) 15, a captured substance to which the magnetic attraction force does not act or magnetic floc containing only a small amount of magnetic powers and undergoing almost no magnetic force (occupying several percents of the entire removed substance or several percents of the magnetic floc) is not attracted by the magnetic field generator (the permanent magnet 28 and the magnetic pole 29). Thus, these captured substances remain on the net 15, but a small amount of deposits do not immediately obstruct permeation. However, as the amount of deposits increases in proportion to the period of operation, they hinder permeation. Accordingly, this embodiment attempts to wash such deposits. The purified water 25 in the purified water vessel 23 is sucked through an intake 47 by means of a pump 46 and then fed through a conduit 48 to a shower pipe 49, which injects shower water 50 into the net through pores therein in such a manner that the water jets from an outer surface of the net 15 toward an inner surface thereof. The deposits accumulated on the inner surface of the net 15 are released by the shower water to recover the net 15. The shower water and the released deposits are collected in a tray 51 provided inside the net 15, pass through a drain port 52 and a pipe 54, and flow out as shown by an arrow C. This washing water is returned to an upstream side of the raw water reservoir 5 via a pump 53 and a pipe 54, and the removed substance is remagnetized and magnetically separated as in the above described embodiment. According to this embodiment, since an amount of deposits to be removed is small, only a small amount of washing water is required, thereby limiting a decrease in the amount of purified water to several percents. This prevents a captured substance to which magnetic attraction force does not act from depositing on the net surface, without a substantial decrease in purification capacity. In addition, since only a small amount of washing water is required, a repeated stress on the net caused by pressure of the washing water can be reduced to preclude a decrease in the lifetime of the net. In this embodiment, the pump 46 for supplying washing water may be located outside the purified water vessel 23 so that raw water or the like can be used as washing water.

In FIG. 5, by bringing the inner surface of the net 15 into contact with the shell 31 or locating the inner surface close to the shell, a liquid layer or a sludge layer can be located between the inner surface of the net 15 and the shell 31 as a bridge to reduce peeling resistance exerted when the magnetic floc 27 is peeled off due to its surface tension or the like. This enables the magnetic floc to be magnetically separated with a weaker magnetic force. In this case, a pump or the like may be used to supply part of the purified water 25 to between the inner surface of the net 15 and the shell 31 to intentionally form a liquid film layer. Alternatively, the separation effect can be improved by adjusting the rotation speeds of the inner surface of the net 15 and the shell 31 so as to reduce their relative speeds.

Alternatively, if the magnet 28 of the magnetic field generator has a high magnetic gradient, the magnetic pole 29 may be omitted.

Figure 7:
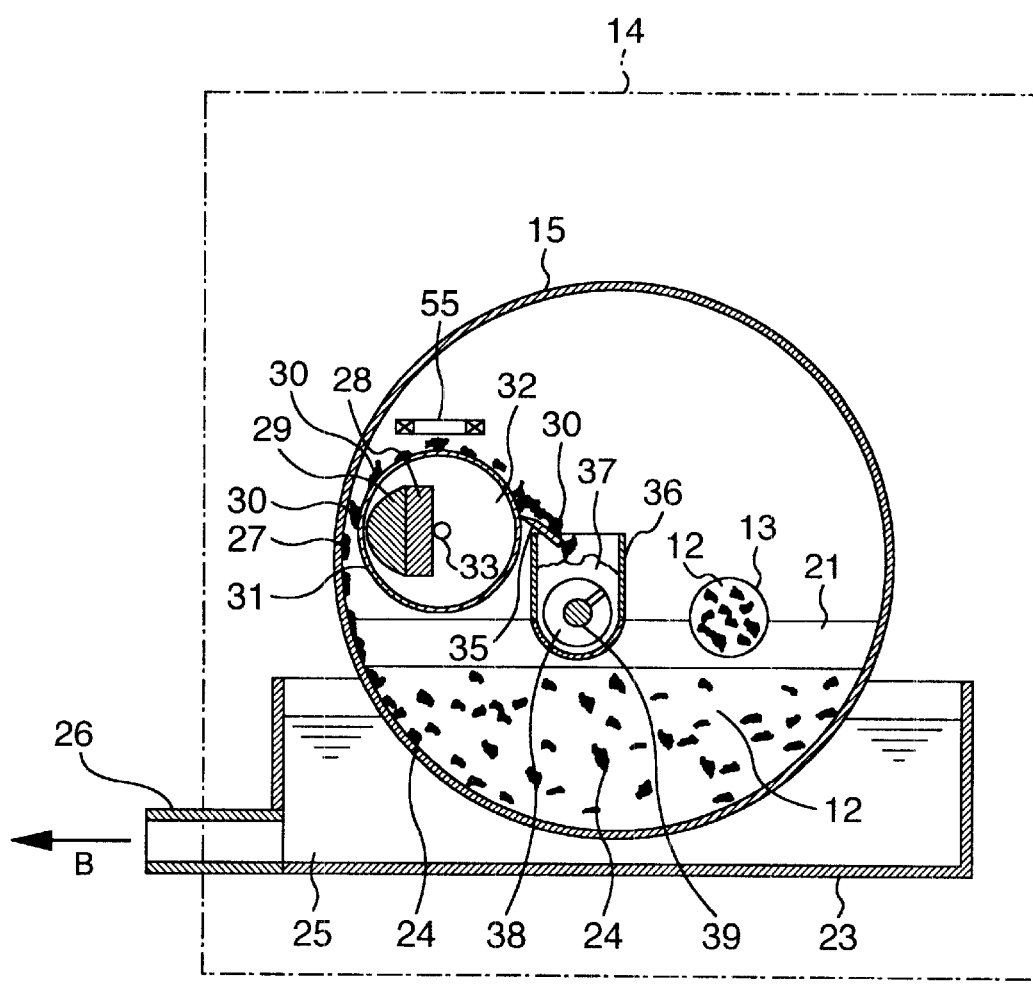
FIG. 7 is a vertical sectional view of an improved structure of the membrane magnetic separating apparatus shown in FIG. 2.

FIG. 7 shows an improved form of the embodiment shown in FIG. 2. The improved form differs from the embodiment shown in FIG. 2 in that an electromagnetic wave generator 55 is used to generate electromagnetic waves to dry and concentrate the separated magnetic floc 30 on the shell 31 which is a non-magnetism. Since magnetic powders are uniformly present throughout the magnetic floc, when exposed to electromagnetic wave, an induction current occurs in the magnetic powders to generate a Joule heat in proportion to the electric resistance value of the magnetic powders. Accordingly, the entire magnetic floc is efficiently heated and has its water evaporated therefrom to further reduce its water content. Consequently, the water content can be reduced to about 85% to 75% without using a dehydration device such as a centrifugal separator or a belt press machine. Instead of the electromagnetic wave generator 55, a heating device such as an infrared lamp or heater or a hot wind may be used to concentrate the magnetic floc.

Figure 8:
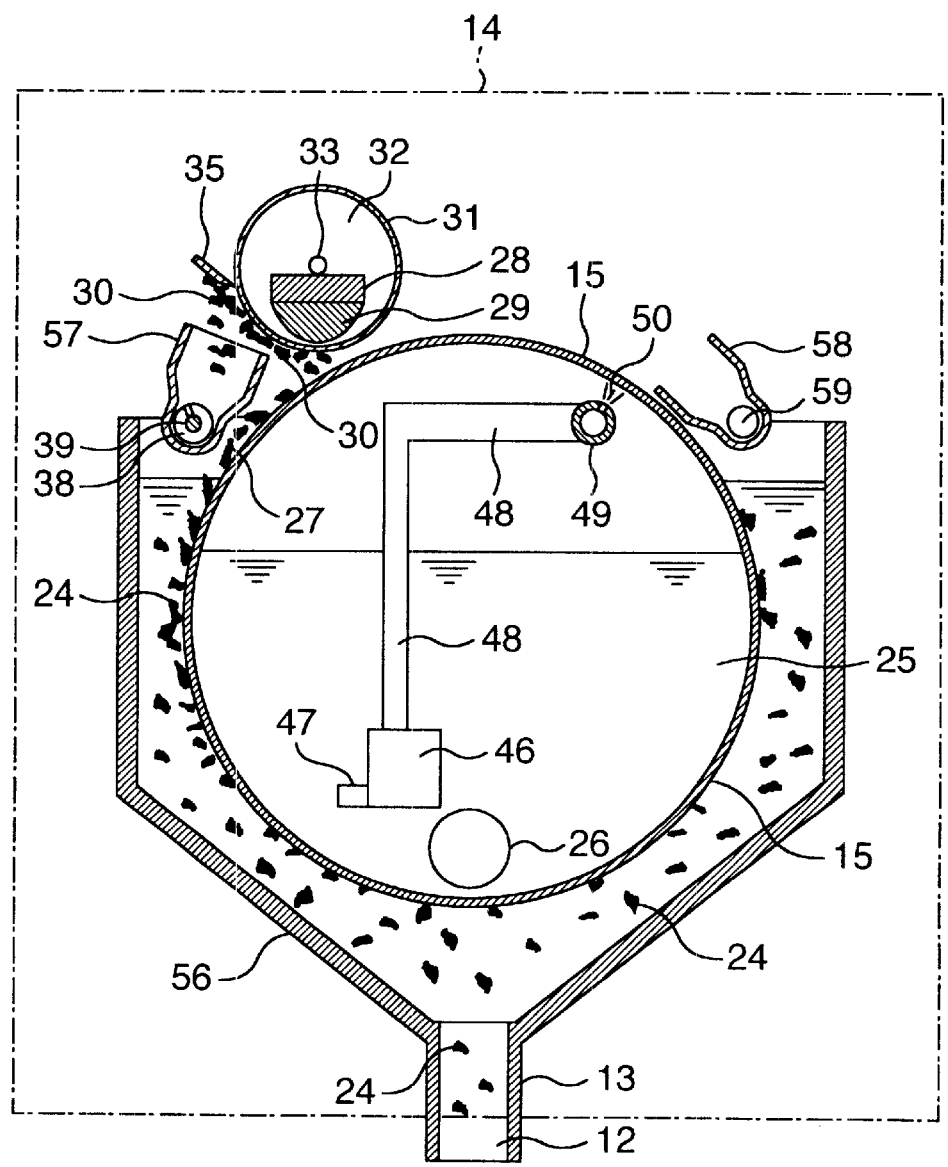
FIG. 8 is a vertical sectional view of a third embodiment of the membrane magnetic separating apparatus of the present invention.

FIG. 8 shows a third embodiment of the present invention. The differences between this embodiment and the embodiment shown in FIG. 5 will be described hereinafter. The water to be treated 12 flows from the conduit 13 into a separation vessel 56 outside the drum-shaped net 15 and then passes through the net 15. At this point, the magnetic floc 24 in the water to be treated is captured by an outer peripheral surface of the net 15. The water which has passed through the net 15 from its outside to inside to become free from the magnetic floc 24 is collected in the net 15 as the purified water 25. The purified water 25 is then discharged to the reservoir 1 or the like through the pipe 26. The water to be treated permeates through the net 15 based on a difference in level between the water to be treated 12 and the purified water 25. On the other hand, the magnetic floc 24 adhering to the outer surface of the net 15 rotating clockwise in FIG. 8 deposits thereon and is exposed to the atmospheric portion above the level. At this point, part of the water in the magnetic floc flows downward along the net 15 due to the gravity, thereby concentrating the deposits. In this case, the water content of the deposits on the membrane (net) surface in the atmospheric portion decreases down to about 95%.

When the magnetic floc 27 exposed to the atmospheric portion approaches a magnetic field generator (comprising, for example, the permanent magnet 28 having a surface magnetic field intensity of 0.5 tesla and the iron magnetic pole 29) located in the atmosphere outside the net 15, it moves at a high speed toward the magnetic pole 29 for magnetic separation, due to a magnetic gradient outside the magnetic field generator. The moving magnetic floc 30 adheres to the non-magnetic moving body (or the thin shell) 31 (made, for example, of stainless steel) that rotationally moves outside the magnetic field generator. Resulting collision force causes excess water to be separated from the magnetic floc 30 and the magnetic floc 30 is further concentrated. The magnetic floc 30 is subjected to a magnetic compression force from the magnetic powders in the magnetic floc because of the magnetic gradient of the magnetic field generator, so that more excess water is pushed out from the magnetic floc 30, which is thus further concentrated. The water content of the magnetic floc decreases down to about 90%.

The shell 31 rotates clockwise in FIG. 8. When the concentrated magnetic floc 30 on the shell 31 surface moves away from the magnetic field generator to weaken the magnetic attraction force, it is released by a scraper (a spatula) 35 and is then separated and collected in a sludge vessel 57 as sludge. The sludge in the sludge vessel 57 is transferred by means of the collecting member 38 and is then ejected from the outlet.

On the other hand, part of the purified water is sucked through the intake 47 of the pump 46 and then fed through the conduit 48 to the shower pipe 49, which injects the shower water 50 into the net 15 through pores therein in such a manner that the water jets from the inner surface of the net 15 toward the outer surface thereof. The deposits accumulated on the outer surface of the net 15 are released by the shower water and the washing water containing the deposits is collected in a tray 58 provided outside the net, while the net 15 is recovered. The washing water in the tray 15 is discharged from a drain portion 59 and returned to the upstream side of the raw water reservoir 5 as in the embodiment shown in FIG. 4.

The sludge ejected from the sludge vessel 57 is stored in the sludge vessel 43 via the pipe 42 as in FIG. 1. Then, the sludge is treated in the same manner as the above-described embodiments.

According to this embodiment, a magnetic separating section (a section for separating the magnetic floc using the magnetic field generator) can be located outside the net 15 to maintain the water to be treated at a high level while allowing the water to be treated to have a large cross section in passing through the net, thereby increasing the amount of water filtered. Consequently, an increased amount of water to be treated can be purified using the same shape and size of the net drum as the above-described embodiments. In addition, the magnetic separating section has a larger installation space than when it is installed inside the net, thereby increasing the size of the magnetic field generator and thus the magnetic field intensity. Accordingly, by enhancing the magnetic force, even a magnetic floc containing only a small amount of magnetic powders can be magnetically separated to reduce the amount of residual deposits. Therefore, it is possible to save the washing water (the shower water 50) used to wash the net. Furthermore, the magnetic field intensity can be increased to enhance the magnetic compression force. Therefore, it is possible to further reduce the water content of the magnetic floc 30.

Figure 9:
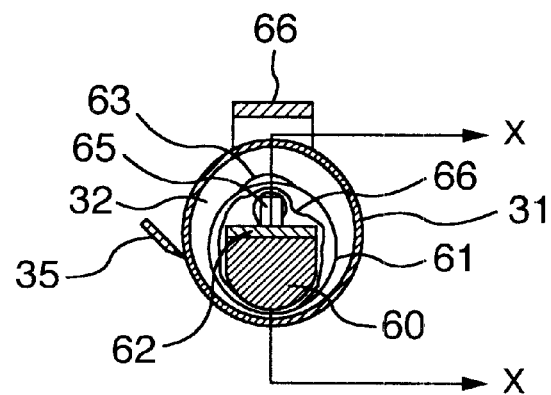
FIG. 9 is a vertical sectional view of another example of a magnetic field generating means for use in the present invention.
Figure 10:
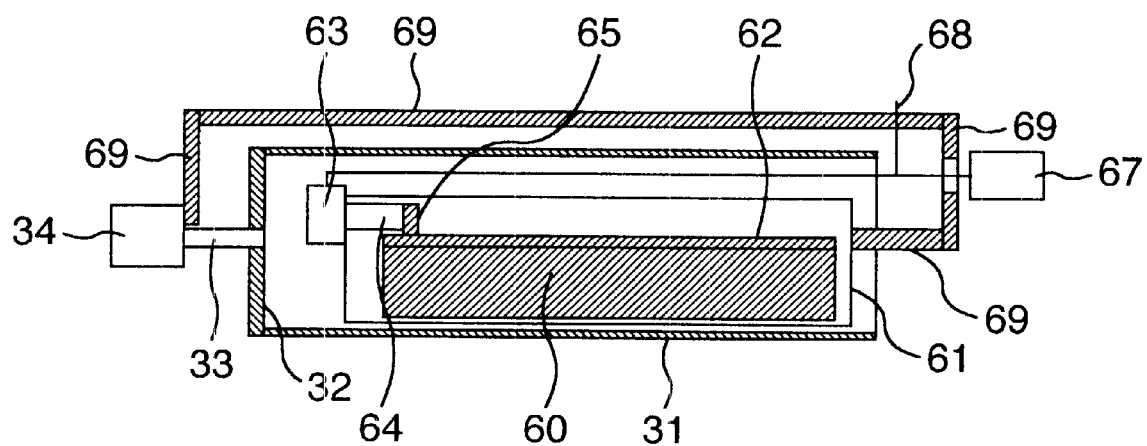
FIG. 10 is a sectional view taken along a line X—X in FIG. 9.

FIGS. 9 and 10 show another structure of the magnetic field generator in each of the above described embodiments. This magnetic field generator employs a bulk 60 of a bismuth-based or samarium-based oxide superconductive material that becomes superconductive at about 77° K. The bulk 60 is located in a vacuum heat-insulating container 61 and has, for example, a thermal copper conductor 62 on a rear surface thereof, and the bulk and the thermal conductor are thermally integrated together. A thermal conducting plate 65 integrated with a cooling end 64 of a pulse tube type refrigerator 63 or the like is thermally integrated with an end of the thermal conductor 62 to cool the conductor 62 to a extremely low temperature of about 50° K. An extremely low temperature section is thermally insulated by a laminated heat insulating material 66. The pulse tube type refrigerator 63 and a compressor 67 are connected together via a pressure pipe 68 to constitute a refrigeration cycle. An end of the motor 34 and the vacuum heat-insulating container 61 are integrated together via a support member 69 for stationary fixation. The bulk 60 is cooled by means of the refrigerator 63 and thereafter, magnetic fields are penetrated from the outside by means of a magnetization device (not shown) so as to cause an inducted permanent current within the bulk. While the bulk is maintained at an extremely low temperature, the bulk can be operated as a permanent magnet for generating, for example, 1-T magnetic fields. Accordingly, this embodiment provides a magnetic field intensity several times as high as that of a conventional neodymium-based normal-temperature permanent magnet and allows a maximum magnetic field to be generated in the center of the magnet contrary to the permanent magnet. Therefore, it is possible to generate a high-gradient magnetic fields in the center of the magnet. This embodiment can thus raise the magnetic field intensity of the magnetic field generator and further improve the magnetic separating effect and the dehydration effect. In addition, since the maximum magnetic field occurs in the center of the magnet and the high-gradient magnetic field can be gradually weakened around the maximum magnetic field, the magnetic floc on the shell 31 does not move in the opposite direction and can thus be easily moved in the shell rotating direction for smooth removal. Similar effects are obtained when the refrigerator is a Gifford Macmahon refrigerator, a Solvay refrigerator, a Starring refrigerator, an auditory refrigerator, or the like. Alternatively, instead of the bulk 60, a superconductive magnet composed of a high-temperature superconductor may be used as a magnetic field generating means.

Figure 11:
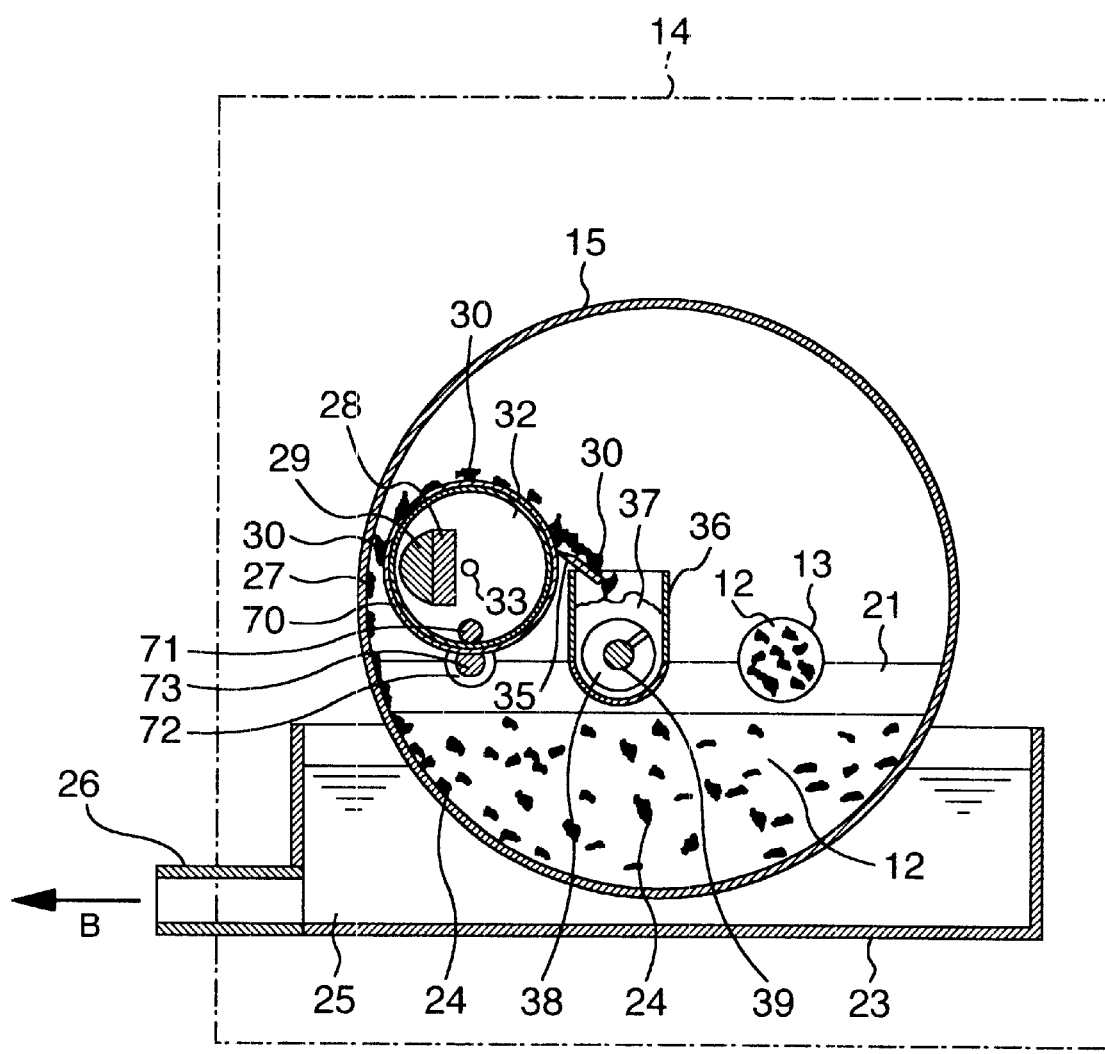
FIG. 11 is a vertical sectional view corresponding to FIG. 2, which is useful in explaining another example of a shell (a moving body) 31 shown in FIG. 2.

FIG. 11 shows another structure of the shell (moving body) 31 in the embodiment shown in FIG. 2 or 5. In this structure, a membrane 70 comprising a water-absorbing material composed of a felt cloth or a moisture-proof fibers of a polymer material is integrally stuck to the outer peripheral surface of the shell 31. In addition, reference numeral 71 denotes a roller located on the inner surface of the shell 31 and reference numeral 73 denotes a drive roller located on an outer surface of the water-absorbing membrane 70 and rotationally driven by a motor 72. These rollers 71 and 73 constitute a dehydration device arranged so that the shell 31 and the membrane 70 are sandwiched between the roller 71 and the drive roller 73. This dehydration device squeezes the membrane 70 to remove absorbed water therefrom and the removed water flows downward in the net 15 due to the gravity. The membrane 70 free from the water then moves clockwise, and the magnetic floc 30 adheres to the membrane because of magnetic separation. Part of the water in the floc is absorbed by the membrane 70 due to surface tension or another action and the floc is scraped from the membrane 70 by means of the spatula 35. Since the scraped magnetic floc 30 has a reduced water content, concentrated magnetic floc can be separated and removed. The membrane 70, from which the magnetic floc has been scraped, is squeezed again by the dehydration device, so that the absorbed water is ejected to an exterior of the membrane. In this structure, the membrane 70 serves to dehydrate the magnetically separated magnetic floc on the moving body 31 during movement, thereby enabling concentrated magnetic floc to be recovered.

Figure 12:
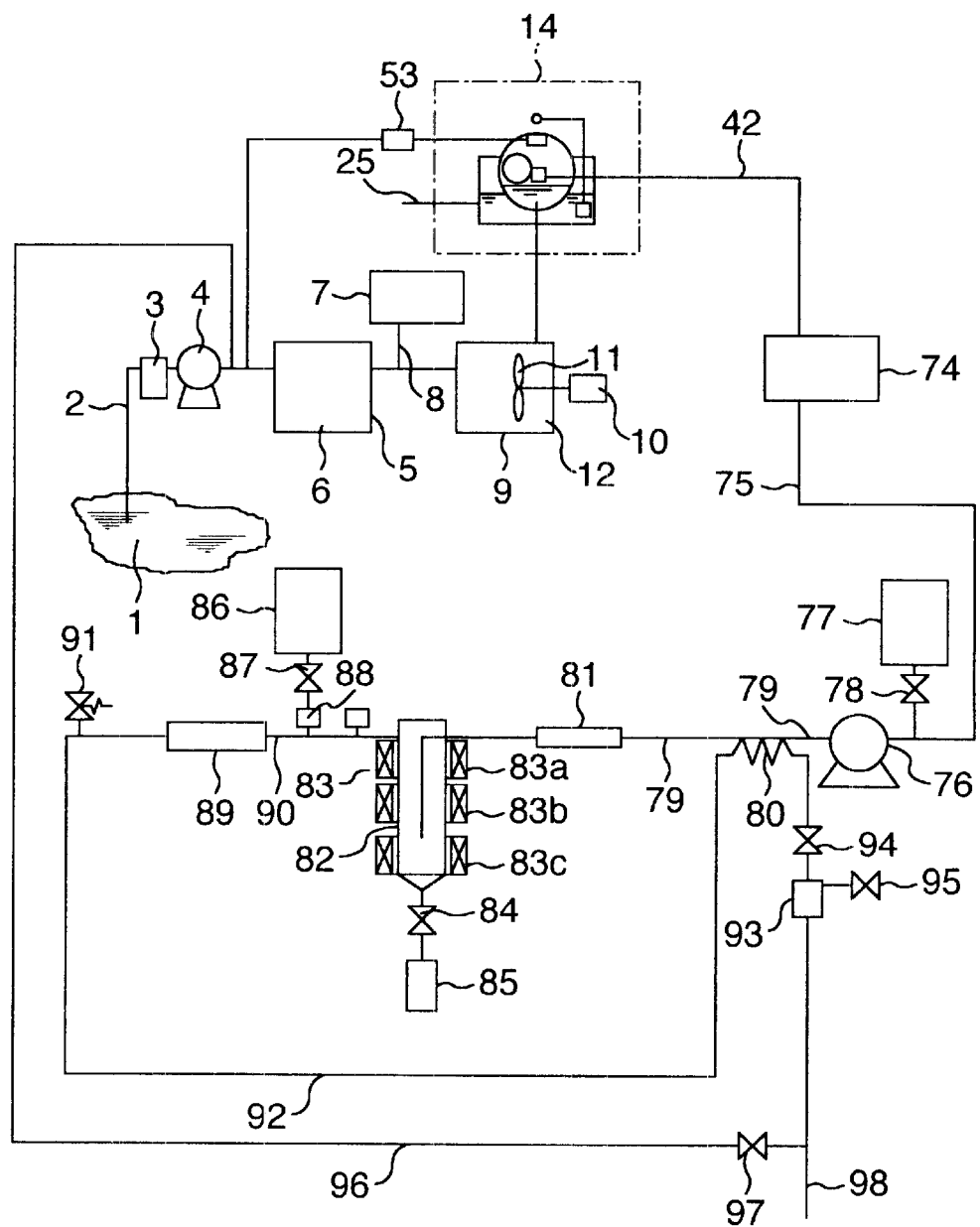
FIG. 12 is a systematic diagram of a modified structure of the membrane magnetic separating apparatus shown in FIG. 4 and its peripheries.

FIG. 12 shows a variation of the embodiment shown in FIG. 4 in which the sludge recovered by the membrane magnetic separating device 14 is thermally decomposed to recover magnetic powders. In this variation, the recovered sludge is introduced into a slurry pressurizing pump 76 from a sludge tank 74 via a pipe 75 without using a dehydration device such as a centrifugal separator. At an inlet section of the slurry pressurizing pump 76, water and a reaction promoter required for treatment at high temperature and high pressure, an alkaline solution acting as a neutralizer, and the like are added to the sludge from an agent tank 77 via a valve 78. The sludge is pressurized to about 2 MPa by means of the slurry pressurizing pump 76 and is ejected to an interior of a reaction pipe 79. The sludge is preheated by a preheat exchanger 80 for recovering heat after treatment. The sludge is heated to 200° C. by means of a temperature regulator 81 having a built-in heater or the like and it thus enters a subcritical state.

Phyto-planktons or zooplanktons or the like in the sludge are organisms, and the coagulant is an inorganic or organic system. Thus, in subcritical water, the coagulated floc and magnetic floc have their bindings destroyed and solids in the floc are decomposed. The organisms become a subcritical solution with an oily viscous liquid and water mixed therein, and the coagulant is released from peripheries of the magnetic powders in the sludge, so that the magnetic powders are individually separated from the sludge. In a magnetic powder separator 82, an agitation means (not shown) promotes separation of the magnetic powders, and magnetism generating means 83, for example, electromagnets 83a, 83b, and 83c are used to guide the separated magnetic powders to an end of this container for collection by turning on and off a power supply to each of the electromagnets. Once a certain amount of magnetic powders have accumulated in the container, the power supplies to the electromagnets are turned off or a conducted current is reduced to lessen an electromagnetic force. A valve 84 is opened to recover magnetic power slurry in a recovery vessel 85 using an internal pressure. The recovered magnetic powders are reused for magnetic separation.

After the sludge has left the magnetic powder separator 82, oxygen, hydrogen peroxide, air, an eutectic reaction agent, an alkaline solution, or the like required for oxidization at high temperature and high pressure is added from the agent tank 86 to the sludge in a reaction pipe 90 having a built-in heater via a valve 87 and a pump 88. The sludge has its temperature controlled in the reaction pipe 90, so that the organisms contained in the sludge are oxidized to reduce its volume. Through chemical reaction, phosphorus present in the sludge becomes a phosphate and then solid sediment. The reaction pipe 90 has a safety valve 91 attached thereto.

Subsequently, a high-temperature high-pressure sludge solution passes through a pipe 92 and then has its heat recovered by the preheat exchanger 80. The solution has its pressure reduced by a pressure adjusting valve 94 and is then sprayed into a flush tank 93. The pressure in the flush tank 93 is adjusted a little higher than the atmospheric pressure by the pressure control valve 94. In the flush tank 93, part of the water in the high-temperature high-pressure sludge solution self-evaporates by their heat volume, while the remaining part is heated by a built-in heater or the like and then evaporated. The evaporated vapors thermally insulate the flush tank 93 and is emitted from the pressure control valve 95. Unoxidized organisms and inorganic molecules in the sludge are dried and solidified in the flush tank 93, and the dried solids sediment and separate at a bottom of the container and are taken out of the tank. Raw water is supplied to the remaining solution via a pipe 96 and a flow control valve 97, and the raw water and the solution are mixed in a pipe 98. The mixture has its water quality adjusted and then discharged to a sewage, a plantation facility or the like.

In this embodiment, the coagulation action of the coagulant is disabled by the high-temperature and high-pressure water, the solids in the floc are decomposed and the coagulant is released from peripheries of the magnetic powders in the sludge. Therefore, the magnetic powders can be individually separated and recovered from the sludge. As a result, very pure magnetic powders are obtained for reuse. In addition, since the sludge can be treated without using a concentration means such as a centrifugal separator or a belt press machine, apparatus costs can be reduced and the reduced volume of the sludge severs to reduce sludge treatment costs. This embodiment is also applicable to the recovery and reuse of magnetic powders where a mixture of magnetic powders and a removed substance is subjected to membrane magnetic separation without using the coagulant and generating magnetic floc.

Figure 13:
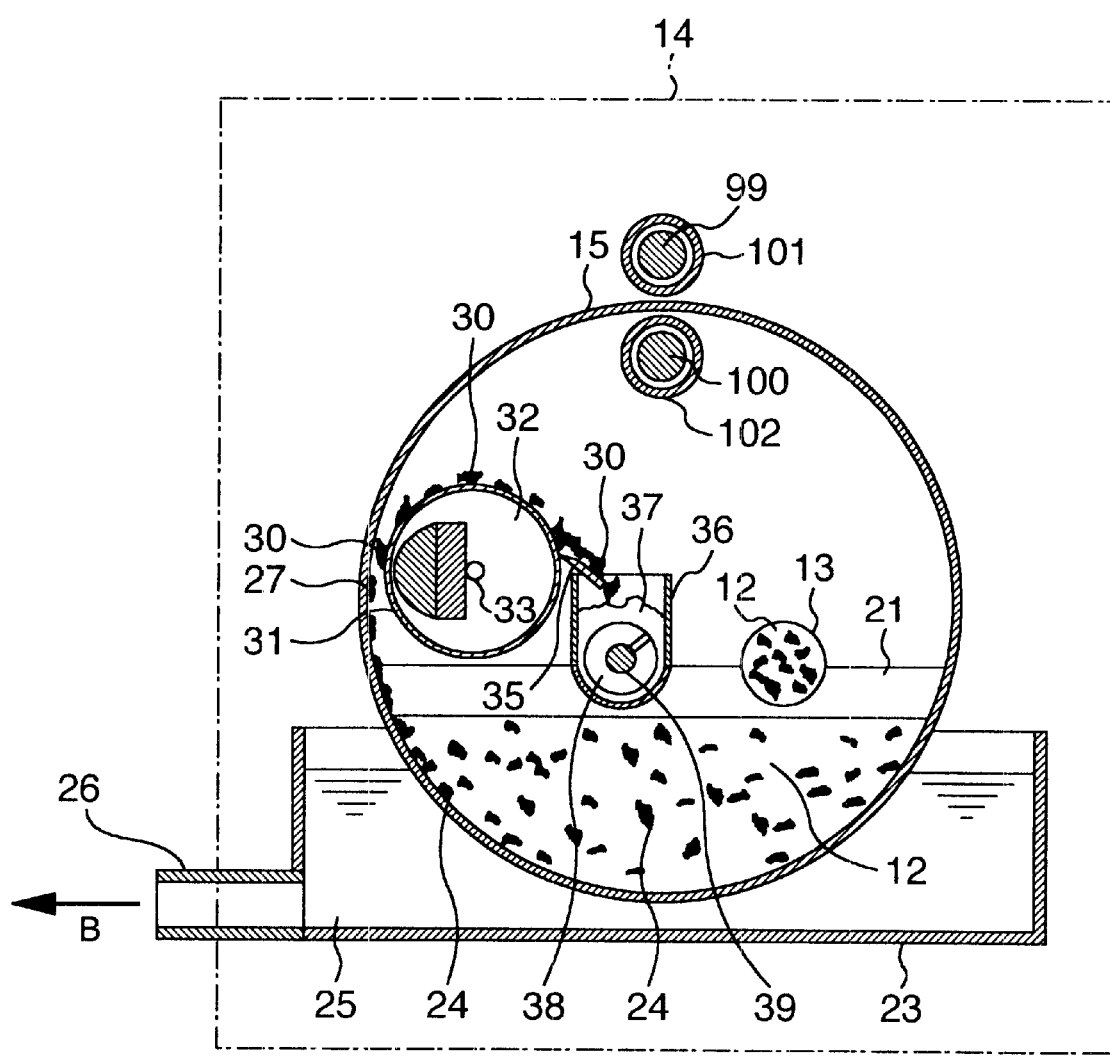
FIG. 13 is a vertical sectional view of an improved example of the membrane magnetic separating device shown in FIG. 2.

FIG. 13 shows an improved structure of the embodiment shown in FIG. 2. It differs from the embodiment shown in FIG. 2 in that ultraviolet lamps 99 and 100 are inserted into protective glass tubes 101 and 102, respectively, which are then arranged in position, to prevent microorganisms in the water to be treated from adhering to the net 15 and propagating to block the net 15. The protective glass tubes 101 and 102 each have a vapor-deposited aluminum film on an inner surface thereof in an upper or lower parts thereof, respectively, so that ultraviolet rays are reflected and applied to the inner and outer surfaces of the net 15. In this embodiment, eggs or larvae of zooplanktons or phytoplanktons are killed by ultra-violet rays and thus do not propagate on the net, thereby preventing blockage of the net 15 or a decrease in the size of sieve openings, which may affect the purification function. In addition, by immobilizing an active oxidizing catalyst substance such as titanium oxide on fine lines or fibers constituting the net 15, adhering organisms other than living things can be oxidized and decomposed to preclude the net 15 from being contaminated with organisms or the like.

Figure 14:
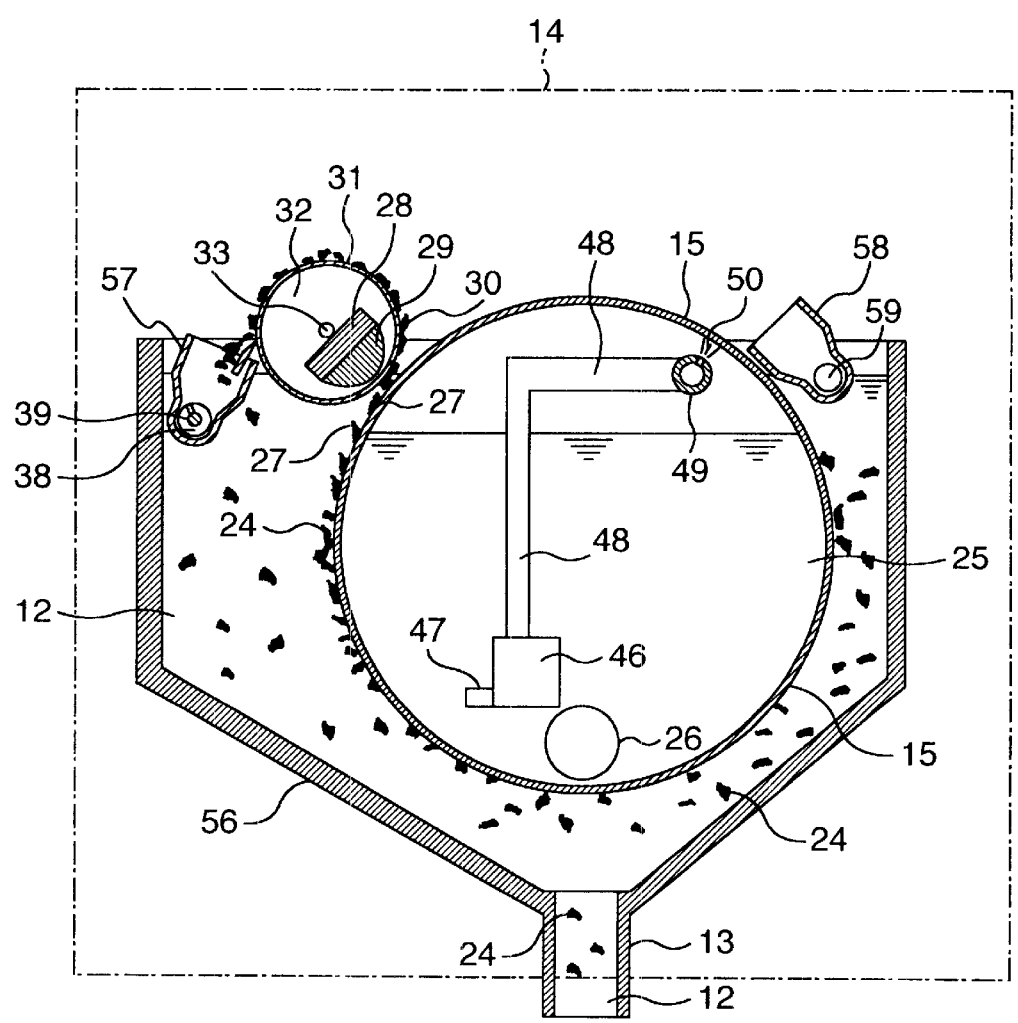
FIG. 14 is a vertical sectional view of a modified form of the membrane magnetic separating device in FIG. 8.

FIG. 14 shows a variation of the embodiment shown in FIG. 8. According to this variation, a magnetic gradient outside a magnetic field generator comprising the permanent magnet 28 of surface magnetic field intensity 0.5 tesla and the magnetic iron pole 29 serves to magnetically separate the magnetic floc 27 from the water to be treated 12. This configuration causes the magnetic floc 27 of density about 1.05 adhering to the drum-shaped net 15 to move through the water to be treated 12 toward the moving body 31. Accordingly, the weight of the magnetic floc is substantially offset by buoyancy, so that magnetic separation is possible even with a weakened magnetic force for moving the magnetic floc. After adhering to the non-magnetic moving body (or thin shell) 31 rotationally moving outside the magnetic field generator, the moved magnetic floc 30 is transferred to the atmospheric portion, where it is dehydrated and concentrated. A moving force corresponding to the gravitational force of the magnetic floc is given by the rotational force of the shell 31, thereby easily moving the magnetic floc from the water to the atmospheric portion. This embodiment requires only a small amount of magnetic powders in the magnetic floc, thereby reducing the amount of magnetic powders added and thus operating costs.

Figure 15:
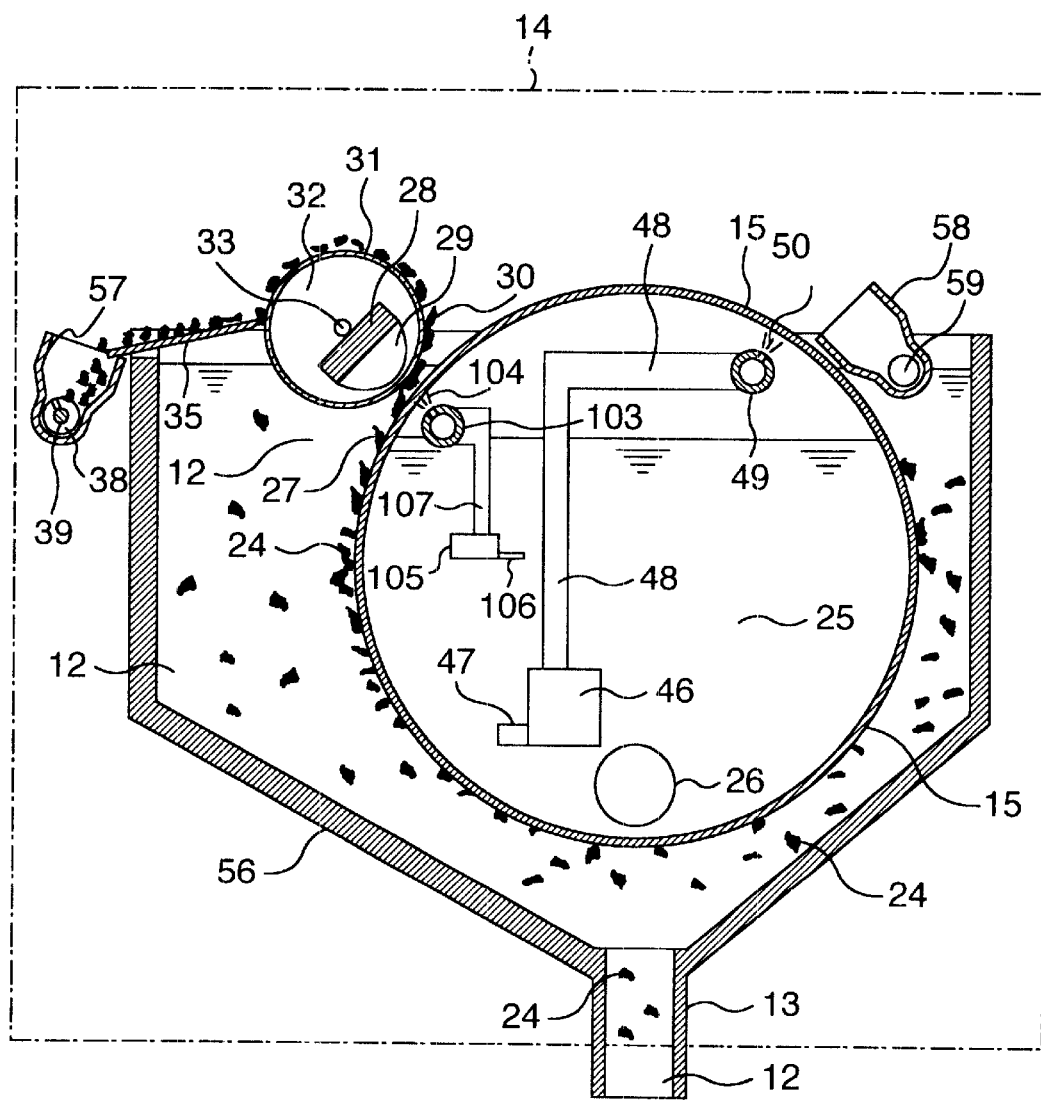
FIG. 15 is a vertical sectional view showing a modified form of the membrane magnetic separating device in FIG. 14.

FIG. 15 shows a variation of the embodiment shown in FIG. 14. In this variation, the purified water 25 in the net 15 is sucked through an intake 106 of a pump 105, and releasing water (the purified water) 104 is sprayed, near the surface of the water to be treated, on the net from pores in a shower pipe 103 via a conduit 107. The water jets from the inner surface of the net 15 toward the outer surface thereof, to release the magnetic floc 27 from the net 15 surface to suspend the floc 27 in the water to be treated 12 near the net 15. Thus, the magnetic force required to move the magnetic flock 27 (of density about 1.05) adhering to the net 15, toward the magnetic field generator can be reduced by an amount corresponding to the elimination of necessity of releasing force. In addition, since the magnetic floc 27 moves through the water to be treated 12, the weight of the magnetic floc is substantially offset by buoyancy, so that magnetic separation is possible even with a weakened magnetic force. After adhering to the non-magnetic moving body (or thin shell) 31 rotationally moving outside the magnetic field generator, the moved magnetic floc 30, which has moved to the magnetic field generator, is transferred easily to the atmospheric portion, where it is dehydrated and concentrated. Additionally, in this embodiment, the sludge vessel 57 is located outside the separation vessel 56. Since this embodiment enables the magnetic floc to be separated from the net 15 with a much weaker magnetic force than the embodiemtn shown in FIG. 14, the amount of magnetic powders in the magnetic floc can be further lessened to reduce operation costs correspondingly to the lessened amount of magnetic powders added. In addition, since the water used to release the magnetic floc passes through the net 15 again to join the purified water 25, it becomes recycled water and does not enter the sludge, thereby preventing an increase in the water content of the sludge.

The present invention is described with reference to the embodiments in which the contaminant in the raw water is converted into the magnetic floc. However, the present invention is applicable also to an apparatus to remove magnetic floc from washing water (this water contains a large amount of magnetic floc and has a high water content of 98%) resulted upon recovering a magnetic filter which has captured magnetic floc in a magnetic separating apparatus that uses the magnetic filter to capture a large amount of magnetic floc at a high speed.

Alternatively, if the substance to be removed is a magnetic substance such as magnetic bacteria or an iron oxide, or a magnetic colloidal substance such as iron hydroxide or iron phosphate, the substance to be removed can be separated and removed at a low water content without any pretreatment to convert the substance into magnetic substance.

By binding a toxic substance such as arsenic to an eutectic body such as iron using ferritization, magnetized particles need not be converted into floc and the substance to be removed can be separated and removed with a low water content.

By providing a series of magnetic field generators with different magnetic fields at a plurality of locations, particles of different magnetic susceptibilities can be classified for magnetic separation.

By providing water repellency or a hydrophilic property for surface of a wire constituting the net 15 to reduce the adhesion of the magnetic floc to the net 15 surface, the force required to release the magnetic floc can be lessened to diminish an amount of releasing water 64 required, thereby reducing the required capacity of a pump 60. The amount of magnetic powders in the magnetic floc can also be further lessened to reduce operation costs correspondingly to the lessened amount of magnetic powders added.

The net 15 may be replaced with a membrane with smaller sieve openings.

In addition, in each of the above-described embodiments, the moving body 31 comprises a cylindrical shell but may comprise a non-magnetic rotating belt.

When the magnetic floc 30, which has moved to the surface of the shell 31, moves away from the magnetism generator, it may return toward the magnetism generator due to the magnetic force but such returning can be prevented by forming recesses and projections on the surface of the shell 31. The magnetic floc can also be prevented from returning by integrating a felt-like cloth with the shell 31 so that fine recesses and projections on a surface of the cloth serve to increase stationary frictional resistance from the magnetic floc.

Similar effects can be obtained without any coagulant by injecting magnetic powders into the raw water for mixture, the magnetic powders being substantially as large as the substance to be removed or smaller than it and small enough to be captured by the net, capturing and depositing the mixture of the substance to be removed and the magnetic powders on the net surface, releasing the mixture from the net at a time based on the magnetic force and moving it in space.

The magnetism generator may be a normally conductive electromagnet or a superconductive electromagnet cooled by a refrigerator.

In each of the above-described embodiments, the net 15 is shaped like a drum but may be shaped like a disc so that a plurality of such discs can be arranged in a vertical direction to constitute an apparatus, and the inner and outer surfaces of the net 15 may be irradiated with ultraviolet rays.

According to the above-described embodiments of the present invention, the magnetic floc on the membrane (net) is attracted by the magnetic force from the magnetic field generator and can thus be magnetically separated from the membrane so as to move toward the magnetic field generator and adhere to the moving body (shell) surface. Resulting collision force causes the water in the magnetic floc to be separated from the floc and flow downward along the membrane surface or fall downward due to the gravity, thereby reducing the water content of the magnetic floc. Furthermore, the magnetic floc is magnetically compressed against the moving body surface, so that excess water is pushed out from the magnetic floc and flows downward along the moving body surface and falls downward due to the gravity, thereby further lowering the water content. Consequently, by using the spatula to scrape the deposits remaining on the moving body (the magnetic floc, that is, the substance to be removed), concentrated sludge of a low water content can be continuously recovered.

According to the present invention, a membrane magnetic separating apparatus is obtained which can separate the substance to be removed captured on the membrane using no or a reduced amount of washing water.

Additionally, according to the membrane magnetic separating apparatus of the present invention, sludge of the substance to be removed with a lower water content and high density can be ejected.

What is claimed is:

1. A membrane magnetic separating apparatus, comprising:
    means for filtering water to be treated containing magnetic substance to be removed, said filtering means having sieve openings through which the magnetic substance to be removed cannot pass;
    a magnetic field generator for magnetically releasing the magnetic substance deposited on said filtering means from a surface of said filtering means;
    a capturing and moving body, provided between said filtering means and said magnetic field generator, for capturing the magnetic substance magnetically released from the surface of said filtering means while the magnetic substance is spatially moving toward said magnetic field generator, the capturing and moving body further moving the captured substance from a first space where a magnetic field intensity from the magnetic field generator is high to a second space where the magnetic field intensity is low;
    a scraper for scraping the magnetic substance on said capturing and moving body in the second space; and
    a sludge vessel for recovering the scraped substance.

2. The membrane magnetic separating apparatus according to claim 1, wherein said magnetic substance to be removed comprises magnetic floc obtained by adding a magnetic substance and a coagulant or an additive that chemically reacts to a substance to be removed to generate a magnetic substance, to a fluid to be treated containing a magnetic or non-magnetic substance to be removed.

3. The membrane magnetic separating apparatus according to claim 1, wherein said magnetic substance to be removed comprises magnetic floc obtained by adding a magnetic substance to a fluid to be treated containing a non-magnetic substance to be removed.

4. The membrane magnetic separating apparatus according to claim 1, further comprising a heating device for heating the substance to be removed on said capturing and moving body.

5. The membrane magnetic separating apparatus according to claim 4, wherein said heating device selectively heats a dielectric in the substance to be removed on said capturing and moving body.

6. The membrane magnetic separating apparatus according to claim 1, further comprising a sterilization device for sterilizing a filtering surface of said filtering means or a capturing surface of said capturing and moving body.

7. The membrane magnetic separating apparatus according to claim 1, wherein said capturing and moving body has an oxidation catalyst for oxidizing organisms on the capturing surface thereof.

8. A membrane magnetic separating apparatus comprising:
    a device for generating water to be treated containing a magnetic floc which is formed from a substance to be removed by adding a magnetic substance and a coagulant to a fluid containing the substance to be removed;
    a filter for filtering the water to be treated, the filter having sieve openings through which the magnetic flock in the water to be treated cannot pass;
    a magnetic field generator for magnetically releasing the magnetic floc deposited on said filter, from a surface of the filter;
    a capturing and moving body, provided between said filter and said magnetic field generator, for capturing the magnetic floc magnetically released from the surface of the filter while the magnetic floc is spatially moving toward said magnetic field generator, the capturing and moving body further moving said captured magnetic floc from a first space where a magnetic field intensity from the magnetic field generator is high to a second space where the magnetic field intensity is low;
    a scraper for scraping the magnetic floc on said capturing and moving body in the second space; and
    a sludge vessel for recovering the scraped magnetic floc.

9. The membrane magnetic separating apparatus according to claim 8, further comprising a water absorbing material added to said capturing and moving body and having a water absorbing function, and a dehydration device for removing water absorbed by said water absorbing material.

10. A membrane magnetic separating apparatus comprising:
    a filter for filtering water to be treated containing magnetic substance to be removed, the filter having sieve openings through which the magnetic substance cannot pass;
    a releasing device for using a force of a fluid such as water or air to release the magnetic substance deposited on the filter, from a surface of the filter;
    a magnetic field generator for moving the released magnetic substance so as to be magnetically attracted;
    a capturing and moving body, provided between said filter and said magnetic field generator, for capturing the magnetic substance released from the surface of the filter while the magnetic substance is spatially moving toward said magnetic field generator, the capturing and moving body further moving said captured substance from a first space where a magnetic field intensity from the magnetic field generator is high to a second space where the magnetic field intensity is low;

a scraper for scraping the magnetic substance on said capturing and moving body in the second space; and a sludge vessel for recovering the scraped substance.

11. A membrane magnetic separating apparatus comprising:

means for filtering water to be treated containing magnetic substance to be removed, the filtering means having sieve openings through which the magnetic substance cannot pass;

magnetic field generating means for magnetically releasing the magnetic substance deposited on the filtering means, from a surface of the filtering means;

capturing and moving means, provided between said filtering means and said magnetic field generating means, for capturing the magnetic substance released from the surface of the filtering means while the magnetic substance is spatially moving toward said magnetic field generating means, the capturing and moving body further moving said captured substance from a first space where a magnetic field intensity from the magnetic field generating means is high to a second space where the magnetic field intensity is low;

means for scraping the magnetic substance on said capturing and moving body in the second space; and means for recovering the scraped substance.

12. A membrane magnetic separating apparatus comprising:

means for generating water to be treated containing a magnetic floc which is formed from a substance to be removed by adding a magnetic substance and a coagulant to a fluid containing the substance to be removed;

means for filtering the water to be treated, the filtering means having sieve openings through which the magnetic flock cannot pass;

magnetic field generating means for magnetically releasing the magnetic floc deposited on said filtering means from a surface of the filtering means;

capturing and moving means, provided between said filtering means and said magnetic field generating means, for capturing the magnetic floc released from the surface of the filtering means while the magnetic floc is spatially moving toward said magnetic field generating means, the capturing and moving means further moving said captured magnetic floc from a first space where a magnetic field intensity from the magnetic field generating means is high to a second space where the magnetic field intensity is low;

means for scraping the magnetic floc on said capturing and moving means in the second space; and means for recovering the scraped magnetic floc.

13. A membrane magnetic separating apparatus comprising:

means for filtering water to be treated containing magnetic substance to be removed, the filtering means having sieve openings through which the magnetic substance cannot pass;

means for releasing the magnetic substance deposited on the filtering means from a surface of the filtering means by a force of a fluid such as water or air;

magnetic field generating means for moving said released substance so as to be magnetically attracted;

capturing and moving means, provided between said filtering means and said magnetic field generating means, for capturing the magnetic substance released from the surface of the filtering means while the magnetic substance is spatially moving toward said magnetic field generating means, the capturing and moving body further moving said captured substance from a first space where a magnetic field intensity from the magnetic field generating means is high to a second space where the magnetic field intensity is low;

means for scraping the magnetic substance on said capturing and moving means in the second space; and means for recovering the scraped substance.

* * * * *